United States Patent
Yu et al.

(10) Patent No.: US 9,690,864 B2
(45) Date of Patent: Jun. 27, 2017

(54) METHOD FOR MANAGING USER SCHEDULE AND DEVICE USING THE SAME

(75) Inventors: Seung-dong Yu, Gyeonggi-do (KR); Woo-yong Chang, Gyeonggi-do (KR); Se-jun Park, Gyeongg-do (KR); Min-jeong Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 196 days.

(21) Appl. No.: 12/862,456

(22) Filed: Aug. 24, 2010

(65) Prior Publication Data

US 2011/0047497 A1 Feb. 24, 2011

(30) Foreign Application Priority Data

Aug. 24, 2009 (KR) .......................... 10-2009-0078342

(51) Int. Cl.
*G06F 17/30* (2006.01)
*G06Q 10/10* (2012.01)

(52) U.S. Cl.
CPC ..... *G06F 17/30873* (2013.01); *G06Q 10/109* (2013.01); *G06Q 10/1093* (2013.01)

(58) Field of Classification Search
USPC ......................................................... 715/772
See application file for complete search history.

(56) References Cited

U.S. PATENT DOCUMENTS

| | | | |
|---|---|---|---|
| 6,785,868 B1 | 8/2004 | Raff | |
| 7,158,980 B2* | 1/2007 | Shen | |
| 7,181,689 B2* | 2/2007 | Mock et al. | 715/703 |
| 7,930,640 B2* | 4/2011 | Dong et al. | 715/764 |
| 8,041,725 B2* | 10/2011 | Grant et al. | 707/758 |
| 2003/0154116 A1* | 8/2003 | Lofton | 705/8 |
| 2004/0109025 A1* | 6/2004 | Hullot et al. | 345/764 |
| 2004/0125142 A1 | 7/2004 | Mock et al. | |
| 2005/0076037 A1 | 4/2005 | Shen | |
| 2006/0190313 A1* | 8/2006 | Lu | 705/8 |
| 2006/0256734 A1 | 11/2006 | Erhart et al. | |
| 2007/0265903 A1* | 11/2007 | Blair et al. | 705/9 |
| 2008/0071599 A1* | 3/2008 | Muguda | 705/9 |
| 2008/0115196 A1* | 5/2008 | Michel et al. | 726/4 |
| 2008/0235084 A1* | 9/2008 | Quoc | G06Q 30/0242 705/14.41 |

(Continued)

FOREIGN PATENT DOCUMENTS

| | | |
|---|---|---|
| CN | 1604102 | 4/2005 |
| CN | 1732508 | 2/2006 |

(Continued)

OTHER PUBLICATIONS

Australian Examination Report dated Aug. 20, 2014 issued in counterpart Application No. 2010287220.

(Continued)

*Primary Examiner* — Stella E Higgs
(74) *Attorney, Agent, or Firm* — The Farrell Law Firm, P.C.

(57) ABSTRACT

A method for managing user schedule and a device using the same are provided. The information stored in an external device is received and added to an existing user schedule. Accordingly, it is possible to integrally manage the user schedules scattered at different locations, and provide improved convenience of using user schedules.

7 Claims, 10 Drawing Sheets

(56) References Cited

U.S. PATENT DOCUMENTS

| | | | |
|---|---|---|---|
| 2008/0268902 A1 | 10/2008 | Kim et al. | |
| 2009/0037843 A1* | 2/2009 | Dong et al. | 715/810 |
| 2009/0158173 A1* | 6/2009 | Palahnuk et al. | 715/753 |
| 2009/0187814 A1* | 7/2009 | Raff | 715/205 |
| 2009/0248480 A1* | 10/2009 | Miksovsky | 705/9 |
| 2009/0259674 A1* | 10/2009 | Griffin et al. | 707/101 |
| 2009/0327919 A1* | 12/2009 | Grant et al. | 715/751 |
| 2010/0083134 A1* | 4/2010 | Gnech et al. | 715/753 |
| 2010/0106404 A1 | 4/2010 | Kim | |
| 2010/0180212 A1* | 7/2010 | Gingras et al. | 715/751 |

FOREIGN PATENT DOCUMENTS

| | | |
|---|---|---|
| EP | 1 995 966 | 11/2008 |
| JP | 61-074476 | 4/1986 |
| JP | 2000-132603 | 5/2000 |
| JP | 2002-157384 | 5/2002 |
| JP | 2006-094056 | 4/2006 |
| JP | 2008-077250 | 4/2008 |
| JP | 2008-276560 | 11/2008 |
| KR | 1020070042028 | 4/2007 |
| KR | 1020080052141 | 6/2008 |
| KR | 1020080108373 | 12/2008 |
| KR | 1020090000609 | 1/2009 |
| KR | 1020090017094 | 2/2009 |
| KR | 1020090035255 | 4/2009 |

OTHER PUBLICATIONS

European Search Report dated Sep. 24, 2014 issued in counterpart Application No. 10812245.8-1955.
Chinese Office Action dated Sep. 25, 2014 issued in counterpart Application No. 201080037639.7.
Japanese Office Action dated Dec. 16, 2014 issued in counterpart application No. 2012-526641.
Chinese Office Action dated Jan. 7, 2015 issued in counterpart Application No. 201080037639.7.
Australian Examination Report dated Jan. 8, 2015 issued in counterpart Application No. 2010287220.
Notice of Acceptance dated Aug. 25, 2015 issued in counterpart Application No. 2010287220, 2 pages.
Japanese Office Action dated Jan. 8, 2016 issued in counterpart Application No. 2012-526641, 20 pages.
Australian Examination Report dated Jun. 15, 2015 issued in counterpart Application No. 2010287220, 5 pages.
Korean Office Action dated Jul. 30, 2015 issued in counterpart application No. 10-2009-0078342, 6 pages.

* cited by examiner

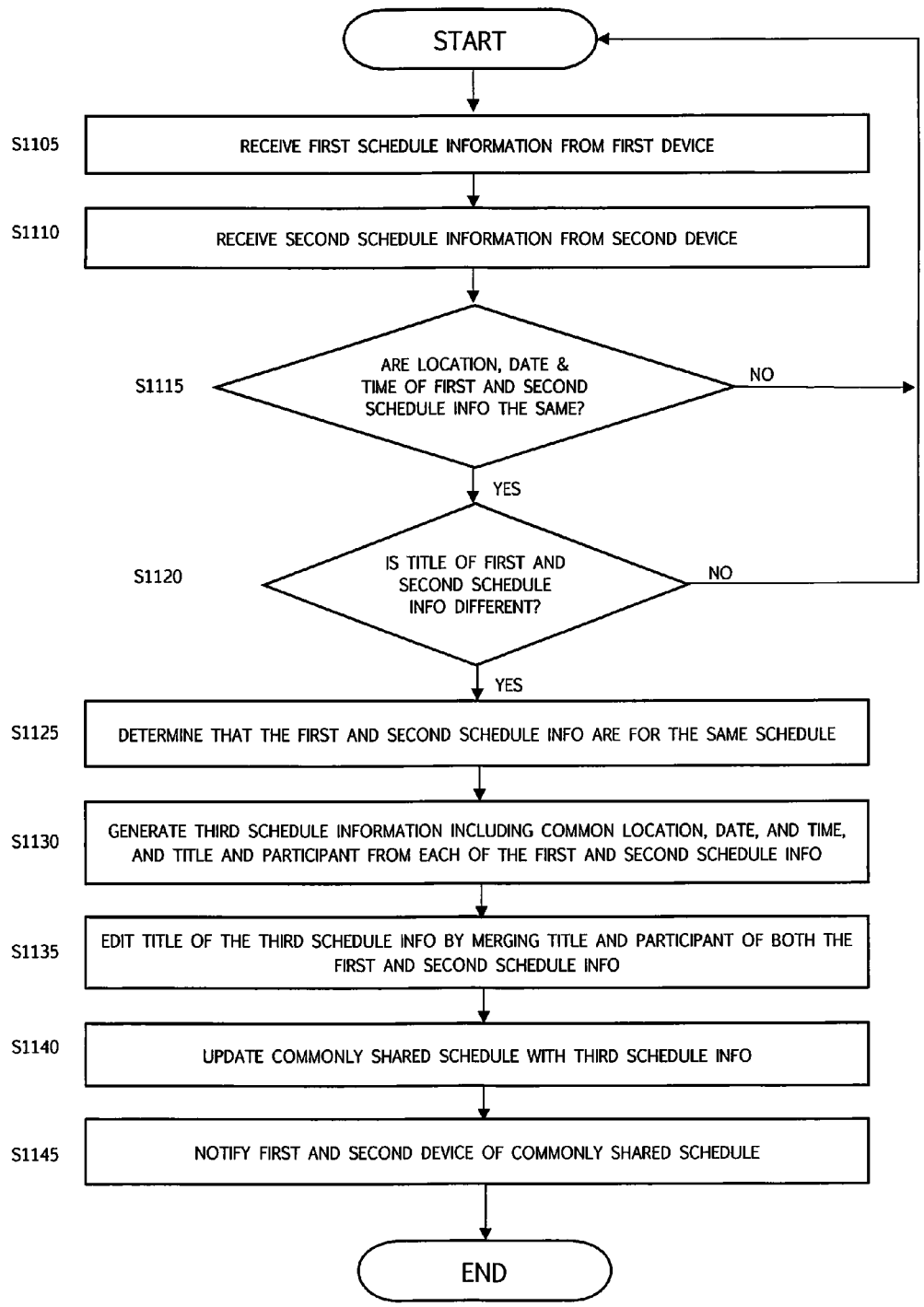

METHOD FOR MANAGING USER SCHEDULE AND DEVICE USING THE SAME

PRIORITY

This application claims priority to Korean Patent Application No. 10-2009-0078342, filed on Aug. 24, 2009, in the Korean Intellectual Property Office, the contents of which are incorporated herein by reference.

BACKGROUND OF THE INVENTION

1. Field of the Invention

The present invention relates generally to a method for managing user schedule and a device using the same, and more particularly, to a user schedule management method stored in a device for use and a device using the same.

2. Description of the Related Art

With the proliferation of digital devices, users today have a variety of digital devices at their disposal.

Digital devices have enhanced convenience and communication in human lives. The digital technology has quickly developed, particularly in recent years, thereby achieving even higher performance and diversity.

Yet, consumers are seeking even more convenient and affluent lives, and are seeking higher performance and functionality in the digital devices.

Meanwhile, there is a limit to the number of functions that a single digital device can provide. Accordingly, a method is required, which enables convergence of functions of digital devices and thus further enhances user convenience.

SUMMARY OF THE INVENTION

Embodiments of the present invention overcome the aforementioned disadvantages occurring in the prior art. According to the present invention, provided is a method of integrally managing user schedules of users dispersed at different locations, and a device using the same are provided.

The method for managing a user schedule includes receiving information stored in a first external device from the first external device, and adding the received information to an existing user schedule.

The method additionally includes receiving an information inputted by a second external device, and adding the inputted information to the user schedule.

The method further includes receiving a notice from a third external device, extracting a date and information from the notice, and adding information using the extracted information and date to the user schedule.

The method also includes displaying the notice, and transmitting the user schedule to a fourth external device.

According to the present invention, a method of managing a user schedule of a display device includes receiving information from at least one user from among a plurality of users, and updating a user schedule corresponding to the information provided by the at least one user, from among a plurality of previously stored user schedules.

The receiving of the information includes receiving the information from at least one of: a main body of the display device, an external terminal device accessible to the display device, and an external server.

The receiving of the information further includes receiving a notice, and extracting a date and information from the notice. The updating of the user schedule includes updating the user schedule using the extracted information and date as the information.

The method additionally includes displaying a user schedule selected from among the plurality of user schedules, determining whether the user schedule including information scheduled for today is present, from among the plurality of user schedules, and displaying the searched user schedule.

The receiving of the information further includes receiving only the information as inputted by a previously registered user.

According to the present invention, a display device includes a network interface, a storage unit which stores a plurality of pieces of user schedule information, and a control unit which updates the user schedule information of the plurality of pieces of user schedule information which corresponds to at least one user, if information is provided by the at least one user through the input unit or the network interface.

The display device additionally includes a display unit for displaying a user schedule according to a user's request.

According to the present invention, it is possible to integrally manage the user schedules dispersed at different locations, and provide improved convenience of using user schedules.

Furthermore, since the information newly inputted through other devices can be integrally managed and extracted from information such as a notice, user convenience is further enhanced.

BRIEF DESCRIPTION OF THE DRAWINGS

The above and/or other aspects of the present inventive concept will be more apparent by describing embodiments of the present inventive concept with reference to the accompanying drawings, in which:

FIG. 11 is a flowchart of a process for sharing common schedule information with a plurality of users, according to the present invention.

DETAILED DESCRIPTION OF EMBODIMENTS OF THE INVENTION

Figure 1:
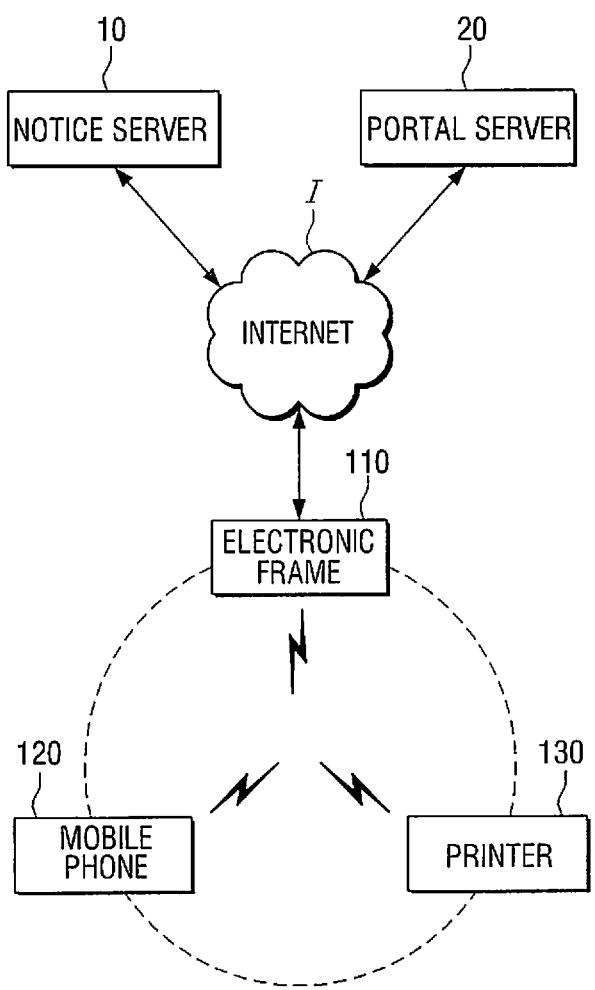
FIG. 1 illustrates a network to which the present invention is applied.

Embodiments of the present invention will now be described in detail with reference to the accompanying drawings. It should be noted that throughout the drawings, the same drawing reference numerals will be construed to refer to the same elements, features and structures. In addition, descriptions of well-known functions and constructions are omitted for clarity and conciseness.

FIG. 1 illustrates a network to which the present invention is applied. Referring to FIG. 1, a network according to an embodiment may include an electronic frame 110, a mobile phone 120, and a printer 130 connected to one another for communication.

Although the electronic frame 110, the mobile phone 120 and the printer 130 are implemented for connection in a wireless manner, if necessary, these may be connected in a wired manner, or in an integrated wired and wireless manner.

Meanwhile, the electronic frame 110 may be communicatively connected to a notice server 10 and a portal server 20 via the Internet (I).

Figure 2:
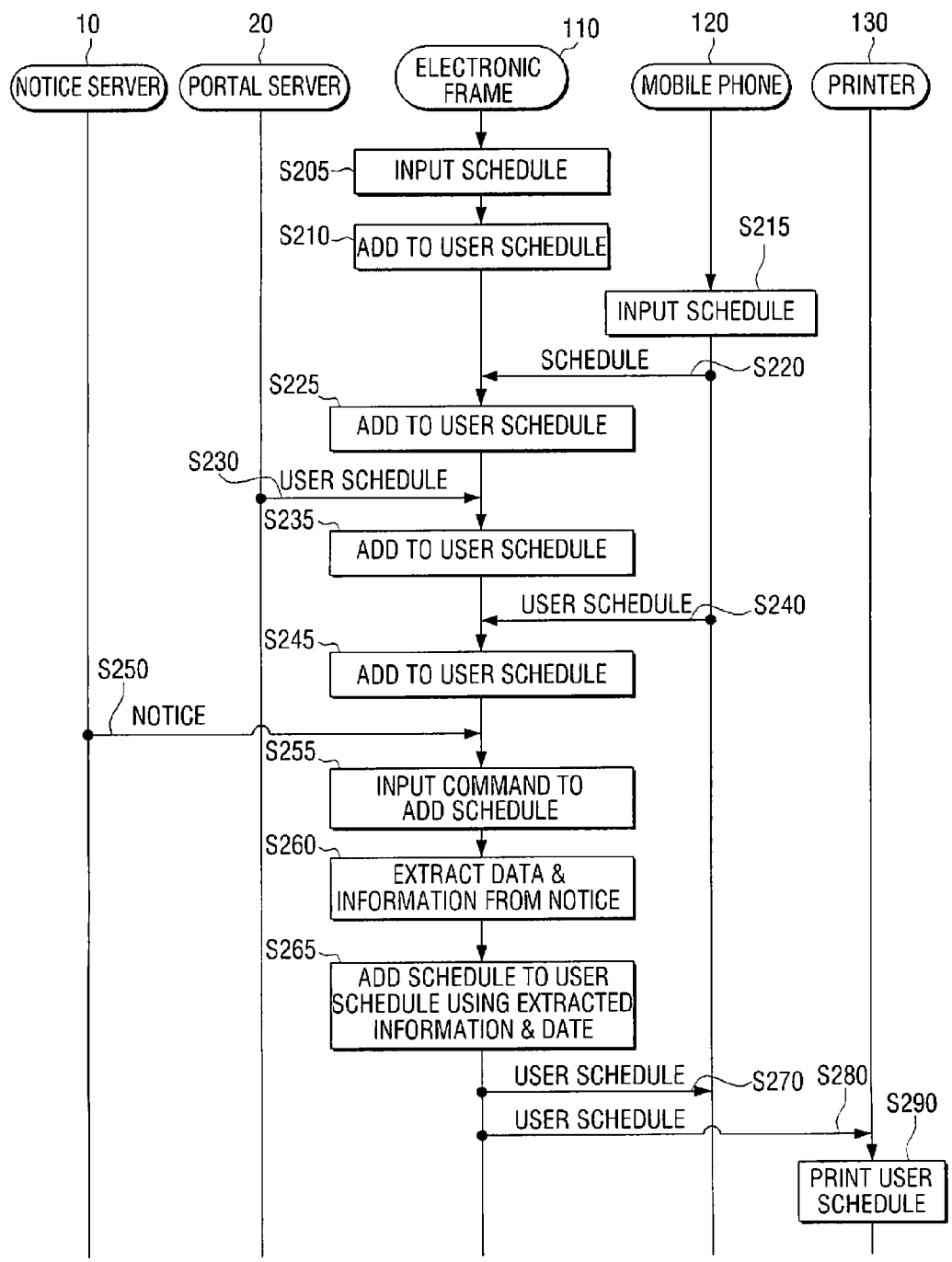
FIG. 2 illustrates a process for an electronic frame to integrally manage user schedule according to the present invention.

The electronic frame 110 manages user schedules scattered at different locations integrally. FIG. 2 illustrates a process for an electronic frame to integrally manage user schedule according to the present invention. Referring to FIG. 2, at step S205, if the user inputs information, at step S210, the electronic frame 110 adds the inputted information to a user schedule. The information at step S205 may be inputted using a touch screen of the electronic frame 110. For example, the information may include arrangement information of a user.

The new information may be inputted through the mobile phone 120, instead of the electronic frame 110. At step S215, if the user inputs the new information through the mobile phone 120, at step S220, the electronic frame 110 receives the inputted information from the mobile phone 120, and at step S225, adds the newly inputted information to the user schedule.

Accordingly, the new information inputted through not only the electronic frame 110, but also the mobile phone 120, may be added to the user schedule of the electronic frame 110.

Figure 3:
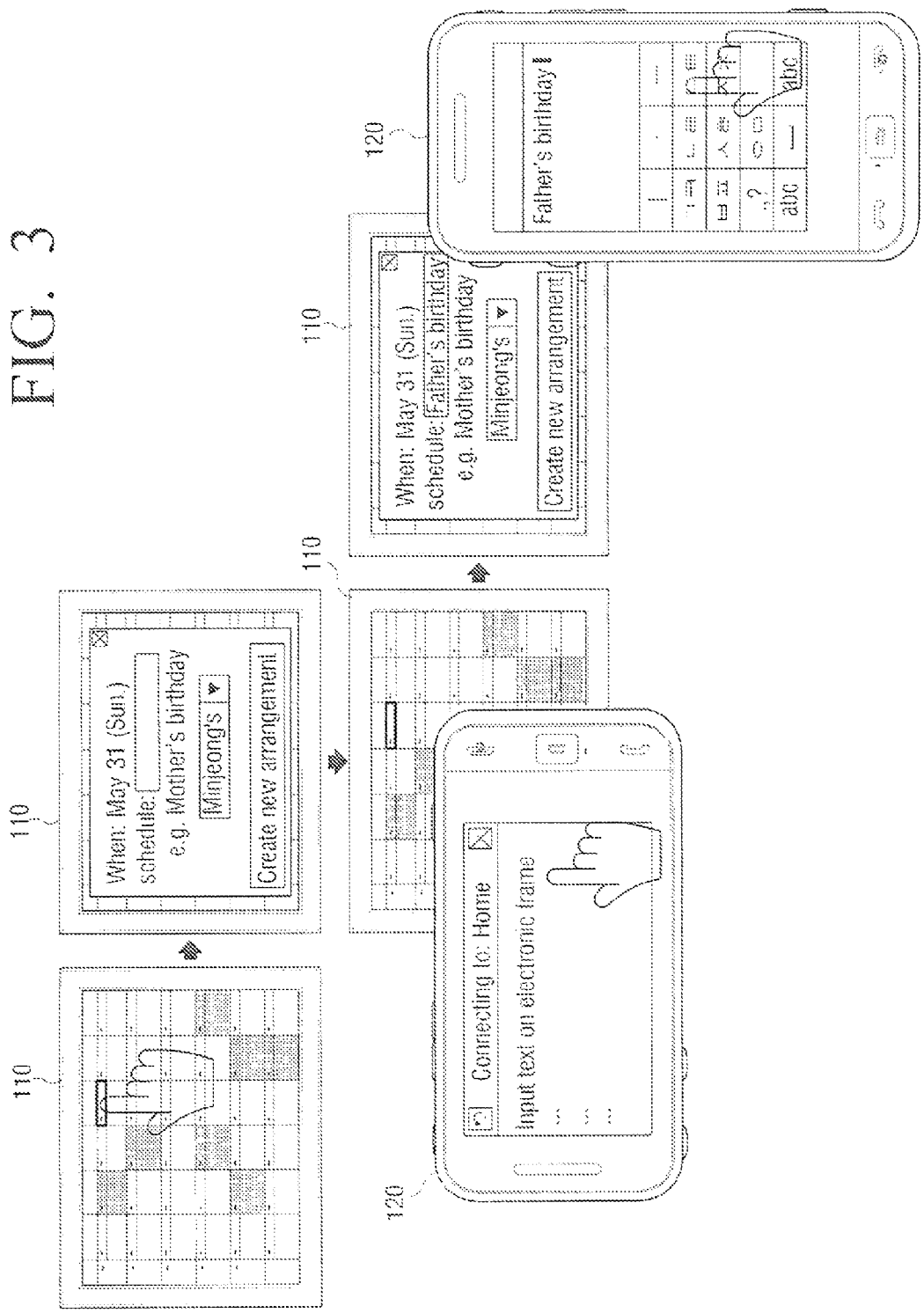
FIG. 3 illustrates a process in which a user inputs information in a user schedule appearing on an electronic frame via mobile phone according to the present invention.

FIG. 3 illustrates the process in which the user inputs new information to the user schedule appearing on the electronic frame 110, through the mobile phone 120, according to the present invention. Referring to FIG. 3, the user inputs new information through the mobile phone 120 on a specific input window called for by the electronic frame 110 based on an input.

At step S230, if a user schedule is received from the portal server 20 via the Internet (I), at step S235, the electronic frame 110 adds all the information included in the received user schedule to the user schedule thereof.

The user schedule received from the portal server 20 at step S230 may refer to user's own information that has been managed by the user through a user schedule management menu provided by the portal.

At step S240, if the mobile phone 120 receives the user schedule from the mobile phone 120, at step S245, the electronic frame 110 adds all the information included in the received user schedule to the user schedule thereof.

The user schedule received from the mobile phone 120 at step S240 may refer to the user's own schedule which has been managed by the user with a user schedule management menu provided by the mobile phone 120.

Accordingly, the user schedule of the electronic frame 110 may include the information managed by the user through both the portal and the mobile phone 120.

At step S250, if a new notice is received from the notice server 10 via the Internet (I), at step S255, and if a command to add the schedule is inputted by the user, at step S260, the electronic frame 110 may extract date and corresponding information from the received notice.

At step S265, the electronic frame 110 then adds the extracted information to the user schedule thereof, as the information for the extracted date.

Figure 4:
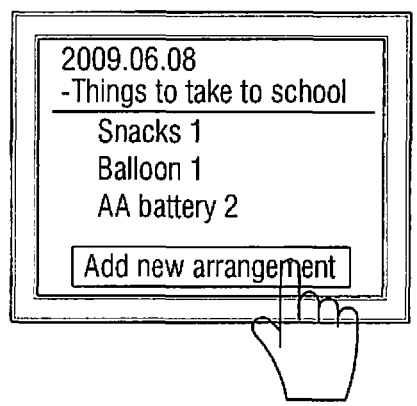
FIG. 4 illustrates a process in which a user inputs a command to add new information to the user schedule based on a notice provided through an electronic frame according to the present invention.

FIG. 4 illustrates a process in which a user inputs a command to add new information on the user schedule based on a notice provided through an electronic frame 110 according to the present invention.

In one example, the electronic frame 110 may extract "2009 Jun. 8" as a date and extract "Snacks 1, balloon 1, AA battery 2" as the corresponding information. The electronic frame 110 may then add the new information to the user schedule thereof based on "Snacks 1, balloon 1, AA battery 2" under date "2009 Jun. 8".

Accordingly, not only the information managed by the user, but also the information extracted from a notice, may be added to the user schedule of the electronic frame 110.

At step S270, the electronic frame 110 may transmit the user schedule thereof to the mobile phone 120, so that the user checks his/her own schedule through the mobile phone 120 instead of the electronic frame 110.

At step S280, the electronic frame 110 may also send out the user schedule thereof to the printer 130, and at step S290, the printer 130 may print out the received user schedule so that the user can check his/her own schedule based on the printout.

The electronic frame 110 may provide the user with integral guide about the information included in the integrated user schedule. As for the manner of giving a guide, the electronic frame 110 may remind the user with display and sound, or alternatively, indirectly remind the user by transmitting a corresponding schedule to the mobile phone 120.

The electronic frame 110 may automatically inform the user when new information is generated, in order to keep the user informed of the integrated user schedules that may be scattered and managed at different locations.

Figure 5:
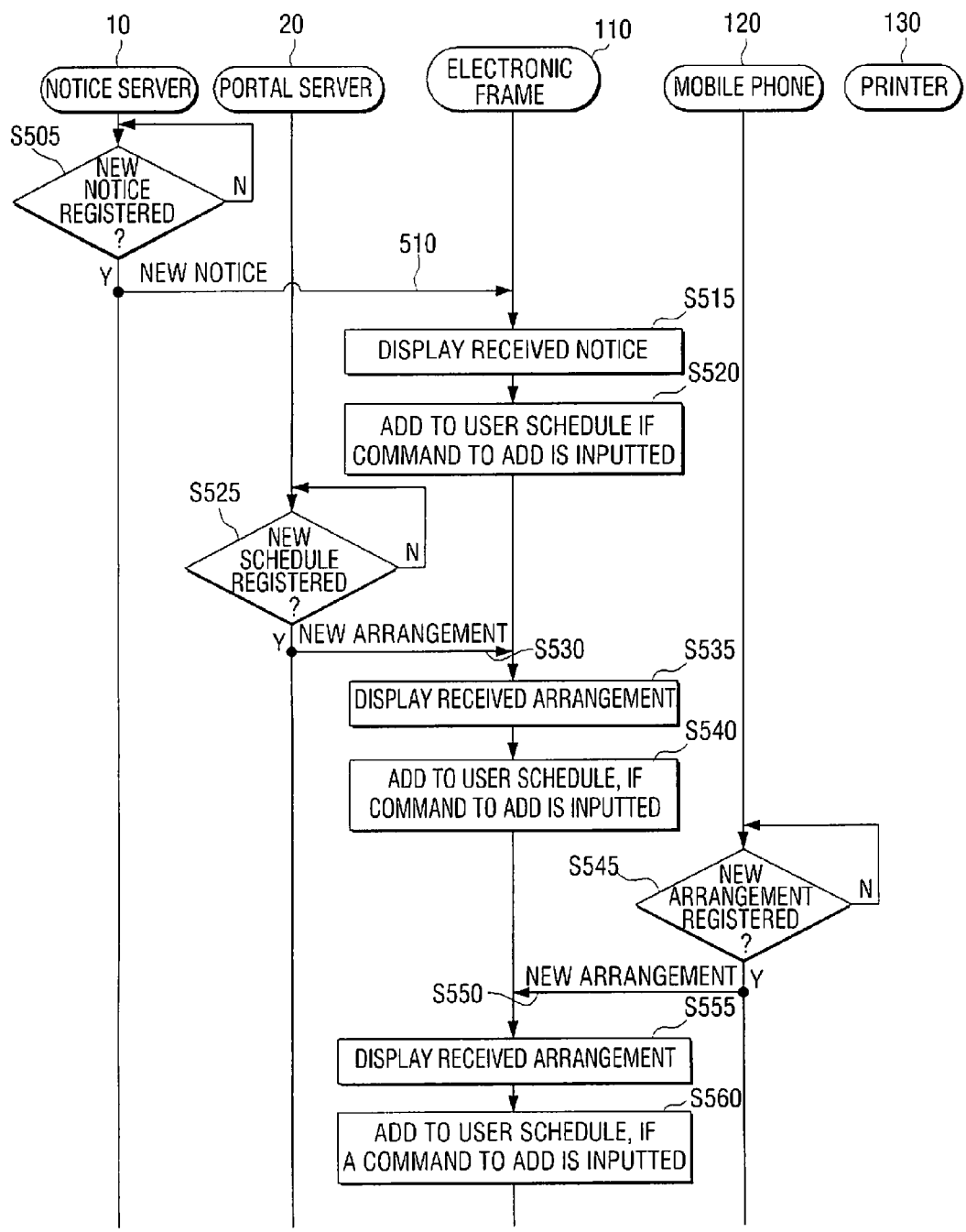
FIG. 5 illustrates a process for an electronic frame to notify a user the generation of new schedule information according to the present invention.

FIG. 5 illustrates a process for an electronic frame to notify a user the generation of new schedule information according to the present invention. Referring to FIG. 5, at step S505, if a new notice is posted, at step S510, the notice server 10 may transmit the newly posted notice to the electronic frame 110 via the Internet I.

At step S515, the electronic frame 110 may display the new notice received at step S510. If a user inputs a command to add the information, at step S520, the electronic frame 110 extracts the date and corresponding information from the newly received notice and adds the extracted information to the user schedule.

Figure 6:
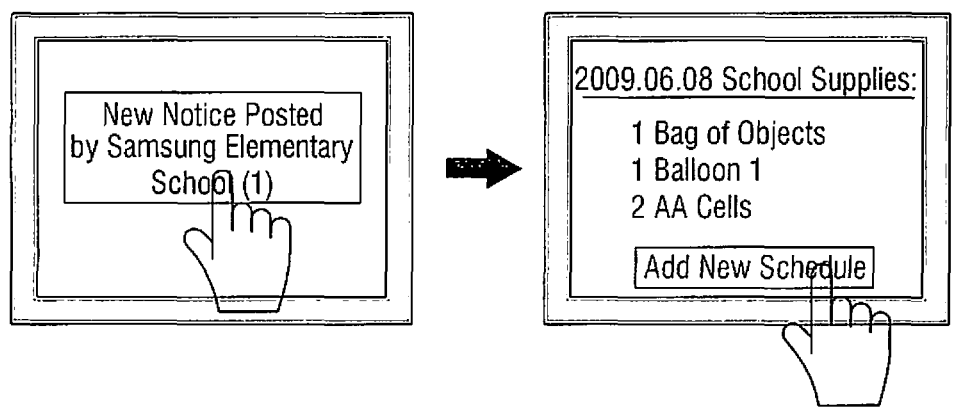
FIG. 6 illustrates a process in which a user inputs a command to add new information to the user schedule based on a new notice displayed on an electronic frame according to the present invention.

FIG. 6 illustrates a process in which a user inputs a command to add new information to the user schedule based on a new notice displayed on an electronic frame according to the present invention.

The new information extracted from the newly posted notice on the notice server 10 is added to the user schedule of the electronic frame 110.

At step S525, if new information is registered, at step S530, the portal server 20 may transmit the newly registered information to the electronic frame 110 via the Internet I.

At step S535, the electronic frame 110 may display the newly received schedule of step S530. If a user inputs a command to add the information, at step S540, the electronic frame 110 may add the newly received information to the user schedule.

Accordingly, the newly registered information on the portal server 20 may be included in the user schedule of the electronic frame 110.

At step S545, if new information is registered, at step S550, the mobile phone 120 may transmit the newly registered information to the electronic frame 110. Accordingly, at step S555, the electronic frame 110 displays the schedule newly received at step S550. If the user inputs a command to add information, at step S560, the electronic frame 110 may add the newly received information to the user schedule.

Accordingly, the newly registered information of the mobile phone 120 may be included in the user schedule of the electronic frame 110.

While automatically informing the user of the generation of new information, the electronic frame 110 may output sound together, to ensure that user recognizes that the new schedule is generated without having to look at the electronic frame 110.

Additionally, the electronic frame 110 may directly transmit the received new schedule to the mobile phone 120 or the printer 130, for the attention of the user on the new schedule.

Figure 7:
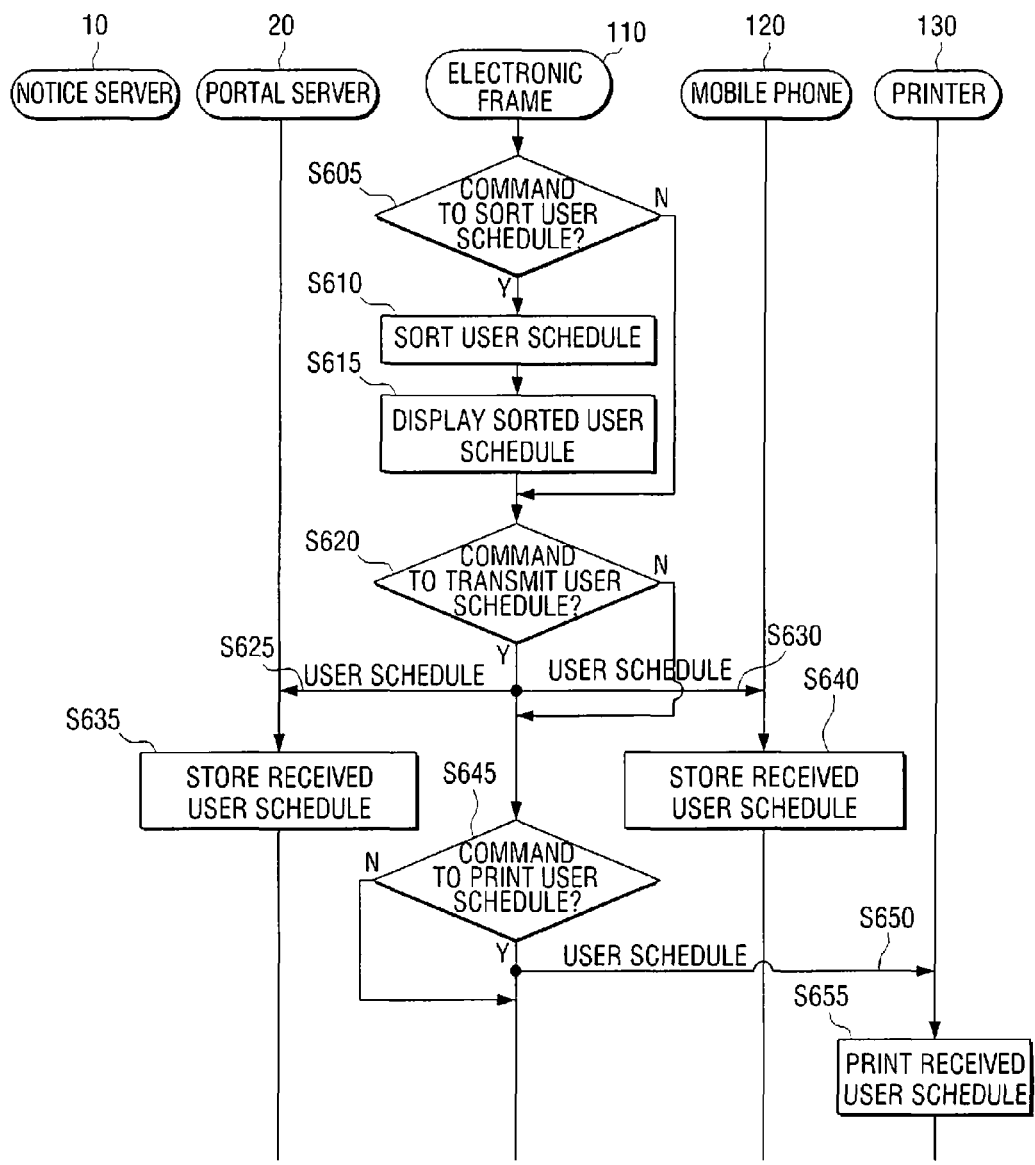
FIG. 7 illustrates a process of sorting user schedule managed integrally through an electronic frame and providing the user schedule as sorted according to the present invention.

FIG. 7 is a view provided to explain a process of sorting user schedule managed integrally through an electronic frame and providing the user schedule as sorted.

Referring to FIG. 7, at step S605, if a command to sort the user schedule is inputted, then at step S610, the electronic frame 110 sorts the user schedule according to the inputted command, and at step S615, displays the sorted user schedule.

The sort command at step S605 may include a command to sort the information based on a date, or time.

At step S620, if a command to transmit the user schedule is inputted, at step S625, the electronic frame 110 transmits the user schedule, sorted at step S610, to the portal server 20 via the Internet I, and at step S630, also transmits the sorted user schedule to the mobile phone 120.

At step S635, the portal server 20 stores the user schedule received at step S625, and at step S640, the mobile phone 120 also stores the user schedule received at step S630.

Accordingly, it is possible to use the sorted user schedule through the portal server 20 and the mobile phone 120.

Meanwhile, referring to FIG. 7, at step S645, if a command to print out the user schedule is inputted, at step S650, the electronic frame 110 transmits the user schedule, sorted at step S610, to the printer 130.

At step S655, the printer 130 prints the user schedule received at step S650, so that the user can check the sorted schedules on the printout.

The foregoing embodiments describe an example where there is one user schedule to manage for illustrative purposes. However, the present invention may be implemented in a manner of integrally or individually managing user schedule information of each of a plurality of users, particularly in an event where there is a plurality of users sharing the electronic frame 110, in which case the user schedule information is provided respectively for each one of the user group.

Accordingly, if the electronic frame 110 compares the information of the respective users and determines that certain information overlap, the electronic frame 110 may notify the overlapping information to the plurality of users, while indicating that the notice is for the attention of a group of users. For example, if user A has the information in his user schedule, 'at 00 place, 7 pm, October 10' under the title 'meeting', and if a user B has his schedule in his user schedule, 'at 00 place, 7 pm, October 10' under the title 'dinner', instead of simply displaying the schedules at 7 pm, October 10 as 'A-meeting, B-dinner', the electronic frame 110 may apply a predetermined editing. Accordingly, the electronic frame 110 may display the information in the form of 'meeting (with dinner), participants—A, B'.

As described above, even when the users manage their user schedule information on their own, since the commonly shared information is noticeably displayed, user satisfaction improves.

Whether or not the information is commonly shared, the schedule may be determined in consideration of date, time, and place information integrally.

Furthermore, the above-described information may be displayed in a variety of manners.

That is, if an integrated schedule display is implemented, in which the user schedules of a plurality of users are integrated and displayed in the integrated form, the electronic frame 110 may display the schedules in the form of a calendar. In this case, the electronic frame 110 may add the information, edited as explained above, at an area that corresponds to the commonly-shared information.

Additionally, the electronic frame 110 may count the elapse of time and display the information of each day on a daily basis. Accordingly, if it is a day of the commonly-shared information, the electronic frame 110 may indicate the information on a screen to notify the plurality of users of the commonly-shared information.

As described above, since the commonly-shared information is notified in a variety of manners, user convenience is maximized.

FIG. 11 is a flowchart of a process for sharing common schedule information with a plurality of users, according to the present invention.

Referring to FIG. 11, at step S1105 the electronic frame 110 receives first schedule information of a first user from a first device, such as the mobile device 120, of the first user. The first schedule information includes information about the first user's schedule, such as a date, a location, a participant (e.g. the first user), and a title of the schedule.

At step S1110, the electronic frame 110 receives second schedule information of a second user from a second device, such as the mobile device 120, of the second user. The second schedule information includes information about the second user's schedule, such as a date, a location, a participant (e.g., the second user), and a title of the schedule.

At step S1115, the electronic frame 110 compares the first schedule information and the second schedule information to determine whether the schedule of the first user and the schedule of the second user are the same. For example, the electronic frame 110 determines whether the location, date, and time of the first schedule information are the same as the location, date, and time of the second schedule information. If the information is not the same, the electronic frame 110 returns to step S1105. If the information is the same the electronic frame 110 performs step S1120.

At step S1120, the electronic frame 110 determines whether the title of the first schedule information is different from the title of the second schedule information. If the information is not different, the electronic frame 110 returns to step S1105. If the information is different the electronic frame 110 performs step S1125.

At step S1125, since the location, date, and time of the first and second schedule information are determined to be the same, while the titles of the first and the second schedule information are determined to be different, the electronic frame 110 determines that the first schedule information and the second schedule information are for the same schedule. That is, the electronic frame 110 determines that the schedule of the first user and the schedule of the second user are the same.

At step S1130, the electronic frame 110, having determined that the schedules are the same, generates schedule information for a common schedule. That is, the electronic frame 110 generates third schedule information which includes the common location, date, and time from the first and the second schedule information, and also includes the different titles and the participants from each of the first and the second schedule information.

At step S1135, the electronic frame 110 edits the title of the third schedule information by merging the title and participant of the first and second schedule information to create a unique title for the third schedule information. For example, as described above, if the first schedule information of user A is 'at 00 place, 7 pm, October 10' under the title 'meeting', and the second schedule information of user B is 'at 00 place, 7 pm, October 10' under the title 'dinner', third schedule information is generated and the title of the third schedule information is edited to 'meeting (with dinner), participants—A, B', as shown above.

At step S1140, the electronic frame 110 updates a commonly shared schedule with the third schedule information, and at step S1145, the electronic frame 110 notifies the first and second devices of the commonly shared schedule.

Meanwhile, a plurality of users may register their user information on the electronic frame 110 and generate the user schedules. For example, the user information may include an ID, or a password. The electronic frame 110 may store the user schedules, generated for each of the users, in the form of folders. If information is provided by the user, the electronic frame 110 may perform authentication of the user using the stored user information. Accordingly, the electronic frame 110 may update the user schedule information using only the information provided by the authenticated users.

Meanwhile, the users may update on the changes in their schedules frequently, using the electronic frame 110 or their own mobile phones 120. In one example, the users may use their accounts registered at the portal server 20 to access the electronic frame 110 and update on changes in their schedules. Accordingly, the electronic frame 110 may modify the user schedules based on the user-related information scattered at a plurality of sites.

For example, if there is an input through at least one of a main body of the electronic frame 110, the mobile phone 120, and the portal server 20, or there is a user command inputted to sort the schedule or the like, the electronic frame 110 may request the user to input user information. The request may be displayed in a user interface (UI) window on a display screen of the electronic frame 110, or in a UI window on the screen of the mobile phone 120 or a user terminal accessing the portal server 20. The requested information may also be inputted through the displayed UI window. The electronic frame 110 may determine whether the inputted user information matches the previously registered user information.

If the inputted user information is determined to be unregistered, the electronic frame 110 may refuse the user command to perform the requested operation. If the inputted user information is registered, the electronic frame 110 may update the information stored under the user schedule folder of the corresponding user. The electronic frame 110 may sort the schedule after confirming the user information.

If a new notice is registered on the notice server 10, the electronic frame 110 may indicate the information about the intended recipient of the notice, while displaying the new notice thereon. For example, if a notice from 'xx company' is registered on the notice server 10, the electronic frame 110 may display the notice, with indicating the name or the title at work of the user who works for the 'xx company'. The notice may also be transmitted to the mobile phone 120 of the intended user directly. Accordingly, the intended recipient of the notice checks the notice and adds necessary information to his user schedule.

A plurality of users may be categorized into a plurality of groups according to a previously-set standard. Accordingly, notices and schedule changes may be performed on a group basis. For example, if a certain notice is for the attention of 'yy department of xx company', the notice may be displayed on the electronic frame 110 along with the names of the members of 'yy department' indicated together. Alternatively, the notice may be transmitted to the mail accounts or mobile phones 120 of the group members.

The notices may be transmitted by SMS or MMS. Meanwhile, if there is a change in the groups, the user schedule information of all the users of the groups maybe integrally moved, copied, or deleted.

In addition, the user schedule information about a plurality of users may be displayed on the electronic frame 110 or transmitted to the external device, entirely or partially depending on the choice by the user.

Alternatively, if the information included in the entire user schedule information includes information schedules for today, the corresponding user schedule information may be displayed on the screen of the electronic frame 110.

If two or more pieces of information are scheduled for today, the information may be displayed altogether, or displayed alternately at predetermined time intervals.

As described above, in various embodiments, the user schedule is managed efficiently even with respect to a plurality of users.

Even when a plurality of users manage user schedules separately, it is possible to integrally provide the user schedules of all the users. In this case, the schedule for each user may be separated by sorting the information based on users.

It is also possible that the sorted user schedule is transmitted to the user's mobile phones 120, respectively, allowing each user to check their own schedule only.

Furthermore, if the users manage their user schedule separately, it is desirable that the notice server 10 and the portal server 20 are managed separately for each user. This is because users may use different notice boards and portals.

The user may set or change his/her nickname on the notice board or the portal as he so chooses. If there is a plurality of users, the users may have different nicknames in the same notice board or portal.

Figure 8:
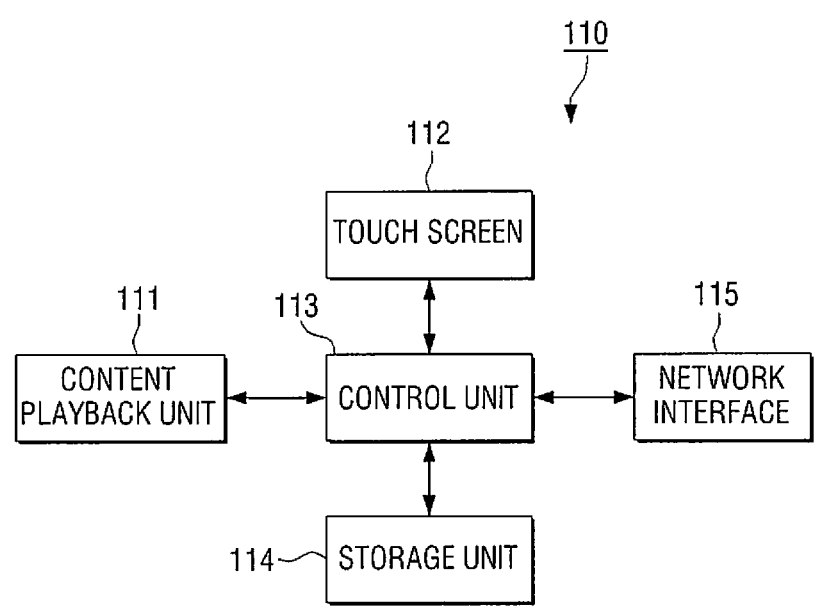
FIG. 8 illustrates a block diagram of an electronic frame according to the present invention.

FIG. 8 is a detailed block diagram of the electronic frame 110. Referring to FIG. 8, the electronic frame 110 may include a content playback unit 111, a touch screen 112, a control unit 113, a storage unit 114, and a network interface 115.

The content playback unit 111 is a function block in charge of the original functions of the electronic frame 110, that is, the function of playing back the stored content of the storage unit 114.

The touch screen 112 may operate as a display to display the content played back by the content playback unit 111 and the graphical user interface (GUI), and an input to receive a user command in the form of a touch on touch screen 112.

Although the display and the input are implemented as a single touch screen in this particular embodiment, this is written only for illustrative purposes. Accordingly, the display and the input may be provided separately.

The GUI on the touch screen 112 may include a user schedule screen that is stored in the storage unit 114 and integrally managed by the electronic frame 110.

The storage unit 114 provides a space to store the content and the user schedule. If a plurality of users manages the user schedule, the storage unit 114 may keep user schedule folders for the respective users. Accordingly, corresponding data stored under the user schedule folder may be updated if a user provides new information.

The network interface 115 may be communicatively connected to the surrounding devices, i.e., the mobile phone 120 and the printer 130, and also to the notice server 10 and the portal server 20 via the Internet I.

The control unit 113 controls the content playback unit 111, the touch screen 112, the storage unit 114 and the network interface 115 to perform the steps of the electronic frame 110 illustrated in FIGS. 2, 5 and 7.

Specifically, as described in the above embodiments, the control unit 113 may receive new information either through an input unit, or from an external terminal or server via the network interface 115.

Accordingly, if at least one user provides new information, the control unit 113 updates the corresponding user schedule information of the stored user schedule information of the plurality of users.

Meanwhile, if a user so chooses, the user schedule information may be displayed through the display unit.

If a new notice is transmitted from the notice server 10 through the network interface 115, the control unit 113 may extract the date and information from the transmitted notice. Specifically, the control unit 113 may parse the text of the received notice and analyze numbers and words, to determine whether or not the acquired numbers are perceivable as dates, and the meaning of the analyzed words, and as a result, determine if the numbers and words have a meaning.

Accordingly, if determining the extracted information and date has meaning, the control unit 113, using the extracted information and date as the information, updates user schedule information of a corresponding user of the notice.

Meanwhile, with respect to a plurality of users, the storage unit 114 may store previously registered user information.

In the abovementioned case, the control unit 113 may perform authentication of at least one user who provides the information, using the user information stored in the storage unit 114.

Specifically, a UI window may be displayed on the touch screen 112 or transmitted to the external terminal device to be displayed thereon, requesting the user to input user information. Accordingly, the control unit 113 determines the authentication to be successful, if the user information inputted through the UI window matches the previously stored user information.

As a result, the control unit 113 updates the user schedule information based on the information inputted by the authenticated user.

Figure 9:
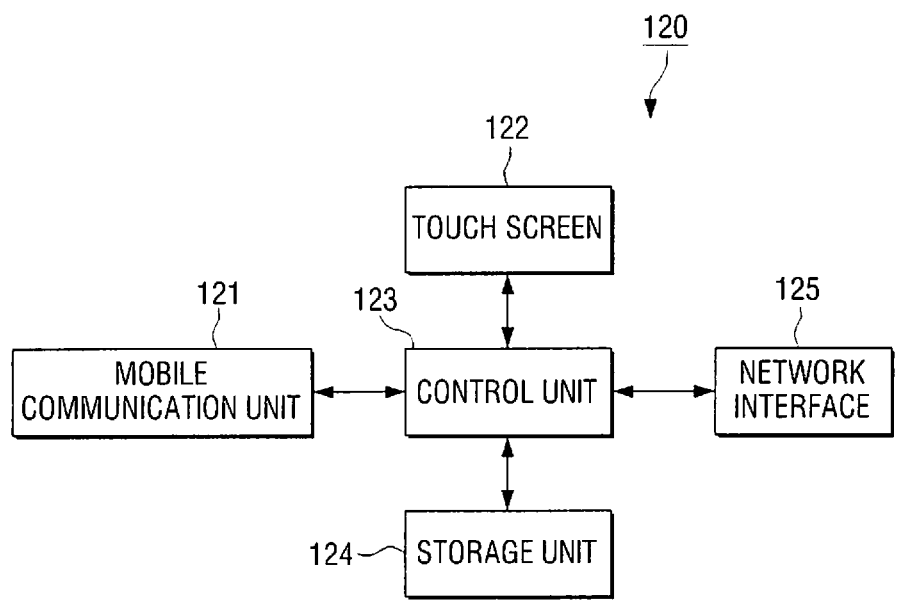
FIG. 9 illustrates a block diagram of a mobile phone according to the present invention.

FIG. 9 is a detailed block diagram of the mobile phone 120. Referring to FIG. 9, the mobile phone 120 may include a mobile communication unit 121, a touch screen 122, a control unit 123, a storage unit 124, and a network interface 125.

The mobile communication unit 121 is a function block responsible for the original and other supplemental functions of the mobile phone 120, such as, calling by mobile communication, SMS, DMB broadcast reception, photographing, schedule management, etc.

The touch screen 122 operates as a display to display a screen necessary for calling by mobile communication, a screen necessary for SMS, and DMB broadcast, content, schedule, and the GUI, and an input to receive a user command in the form of a touch.

The GUI displayed on the touch screen 122 may provide a schedule management screen, and a text input keyboard image for use in inputting information to the electronic frame 110.

The storage unit 114 provides a space to store programs and data necessary for driving the mobile phone 120, and also user schedule. The network interface 125 is communicably connected to the surrounding devices, including the electronic frame 120 and the printer 130. The network interface 125 transmits the user schedule to the electronic frame 120, and may also receive the user schedule from the electronic frame 120.

The control unit 123 controls the mobile communication unit 121, the touch screen 122, the storage unit 124, and the network interface 125 to perform the steps by the mobile phone 120 which are illustrated in FIGS. 2, 5 and 7.

Figure 10:
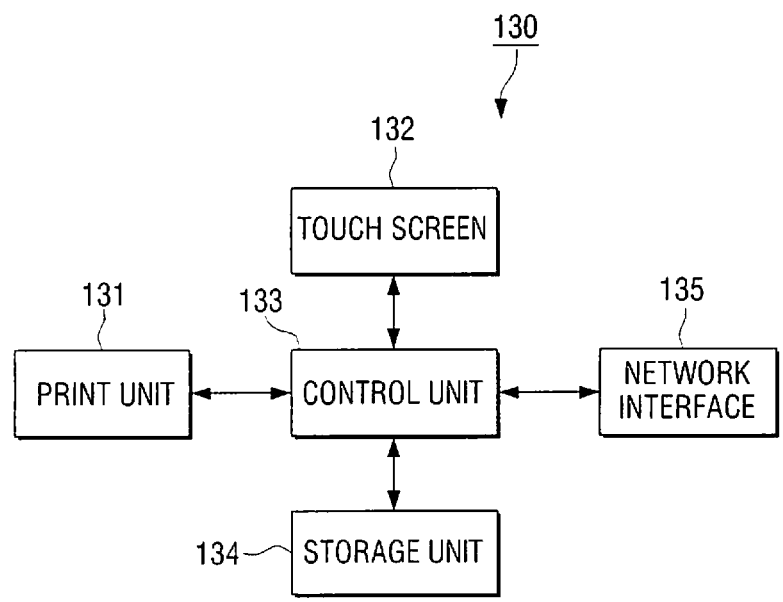
FIG. 10 illustrates a block diagram of a printer according to the present invention.

FIG. 10 is a detailed block diagram of the printer 130. Referring to FIG. 10, the printer 130 may include a print unit 131, a touch screen 132, a control unit 133, a storage unit 134, and a network interface 135.

The print unit 131 is a function block responsible for the original functions of the printer 130, i.e., the function of printing not only the content stored in the storage unit 134, but also the schedule received through the network interface 135.

The touch screen 132 may operate as a display to display the GUI provided by the printer 130, and an input to receive a user command inputted in the form of touch.

The storage unit 134 provides a space to store not only the programs and data necessary for the operation of the printer 130, but also the user schedule received from the electronic frame 110.

The network interface 135 connects the surrounding devices, including the electronic frame 110 and the mobile phone 120, for communication. The network interface 135 receives the user schedule through the electronic frame 110.

The control unit 133 controls the print unit 131, the touch screen 132, the storage unit 134, and the network interface 135 so that the steps by the printer 130 as illustrated in FIGS. 2, 5 and 7 are performed.

The electronic frame 110, the mobile phone 120 and the printer 130 are described in the embodiments explained above for illustrative purposes. Therefore, these devices may be replaced by other similar devices. For example, the electronic frame 110 may be replaced by various types of display devices such as TVs, PC monitors, or the like, and the mobile phone 120 may also be replaced by various types of portable terminals such as PDAs, laptops, smart phones, MP3 players, remote controllers, or the like.

Additionally, the device for providing the information to the electronic frame 110, is not limited to a portable terminal device like mobile phone 120 only. For example, the information may be inputted through fixed terminal devices such as TVs or desktop PCs.

The foregoing embodiments and advantages are not to be construed as limiting the present invention. The present teaching can be readily applied to other types of apparatuses. Also, the description of the embodiments of the present inventive concept is intended to be illustrative, and not to limit the scope of the claims, and many alternatives, modifications, and variations will be apparent to those skilled in the art.

What is claimed is:

1. A method of sharing schedule information with a plurality of users, the method comprising:
receiving first schedule information of a first user from a first device of the first user, the first schedule information comprising at least one of a date, a time, a location, participant, and a title of the schedule of the first user;
receiving second schedule information of a second user from a second device of the second user, the second schedule information comprising at least one of a date, a time, a location, participant, and a title of a schedule of the second user;
when at least the date and the time of the schedule of the first user and the schedule of the second user are the same and the title of the schedule of the first user and the schedule of the second user are different, determining whether the schedule of the first user and the schedule of the second user are a same schedule by comparing the first schedule information and the second schedule information; and
when it is determined that the schedule of the first user and the schedule of the second user are the same schedule:
generating third schedule information including a common date, time, and location, the title and the participant of the first schedule information, and the title and the participant of the second schedule information;
applying predetermined editing to a title of the third schedule information by merging at least a part of the title and the participant of the first schedule information and a part of the title and the participant of the second schedule information;
updating a commonly shared schedule with the third schedule information; and
providing a notification indicating the commonly shared schedule to the first device and the second device based on the commonly shared schedule.

2. The method of claim 1, further comprising:
when a day corresponding to the commonly shared schedule approaches, displaying information to inform that the first user and the second user have the commonly shared schedule ahead.

3. The method of claim 1, wherein the first schedule information further comprises a user name of the first user, and
the second schedule information further comprises a user name of the second user.

4. An apparatus comprising:
a processor; and
a network interface connected to the processor,
wherein the processor performs the method of:
receiving, through the network interface, first schedule information of a first user from a first device of the first user, the first schedule information comprising at least one of a date, a time, a location, participant, and a title of the schedule of the first user;
receiving, through the network interface, second schedule information of a second user from a second device of the second user, the second schedule information comprising at least one of a date, a time, a location, participant, and a title of a schedule of the second user;
when at least the date and the time of the schedule of the first user and the schedule of the second user are the same and the title of the schedule of the first user and the schedule of the second user are different, determining whether the schedule of the first user and the schedule of the second user are a same schedule by comparing the first schedule information and the second schedule information; and
when it is determined that the schedule of the first user and the schedule of the second user are the same schedule:
generating third schedule information including a common date, time, and location, the title and the participant of the first schedule information, and the title and the participant of the second schedule information;
applying predetermined editing to a title of the third schedule information by merging at least a part of the title and the participant of the first schedule information and a part of the title and the participant of the second schedule information,
update a commonly shared schedule with the third schedule information; and
provide a notification indicating the commonly shared schedule to the first device and the second device based on the commonly shared schedule.

5. The apparatus of claim 4, wherein when a day corresponding to the commonly shared schedule approaches, the processor displays information to inform that the first user and the second user have the commonly shared schedule ahead.

6. The apparatus of claim 4, wherein the first schedule information further comprises a user name of the first user, and
the second schedule information further comprises a user name of the second user.

7. The apparatus of claim 4, further comprising:
a storage unit configured to store previously-registered user information,
wherein the processor performs authentication of at least one user using the previously-registered user information, and updates the previously-registered user information using information inputted by the at least one user.

* * * * *